United States Patent
Kajdas et al.

(10) Patent No.: US 9,957,153 B2
(45) Date of Patent: May 1, 2018

(54) HOOD FOR A HORSE'S HEAD

(71) Applicant: Hugo Kajdas, Montpellier (FR)

(72) Inventors: Hugo Kajdas, Montpellier (FR);
Marine Kajdas, Montpellier (FR);
Samuel Kajdas, Montpellier (FR)

(73) Assignee: Hugo Kajdas, Montpellier (FR)

( * ) Notice: Subject to any disclaimer, the term of this patent is extended or adjusted under 35 U.S.C. 154(b) by 0 days. days.

(21) Appl. No.: 15/039,329

(22) PCT Filed: Nov. 18, 2014

(86) PCT No.: PCT/FR2014/000246
§ 371 (c)(1),
(2) Date: May 25, 2016

(87) PCT Pub. No.: WO2015/079126
PCT Pub. Date: Jun. 4, 2015

(65) Prior Publication Data
US 2017/0166434 A1 Jun. 15, 2017

(30) Foreign Application Priority Data

Nov. 28, 2013 (FR) ...................... 13 61727

(51) Int. Cl.
*H04R 1/02* (2006.01)
*B68B 5/00* (2006.01)
(Continued)

(52) U.S. Cl.
CPC .............. *B68B 5/00* (2013.01); *A01K 13/006* (2013.01); *A01K 15/02* (2013.01); *A01K 29/005* (2013.01); *B68C 5/00* (2013.01); *H04R 1/028* (2013.01)

(58) Field of Classification Search
CPC .. B68B 5/00; B68C 5/00; H04R 1/028; A01K 29/005; A01K 15/02; A01K 13/006
See application file for complete search history.

(56) References Cited

U.S. PATENT DOCUMENTS

2002/0152970 A1 10/2002 Takeda
2007/0169444 A1* 7/2007 Hung ................. A01K 13/006
54/80.4

(Continued)

FOREIGN PATENT DOCUMENTS

DE 20 2009 003 177 U1 9/2009
FR 2 581 505 A1 11/1986
NL 1 019 842 C1 7/2003

OTHER PUBLICATIONS

International Search Report, dated Feb. 23, 2015, from corresponding PCT application.

*Primary Examiner* — Andrew L Sniezek
(74) *Attorney, Agent, or Firm* — Young & Thompson

(57) ABSTRACT

A hood (100) for a head of a horse includes: a main part intended to be placed on the head, two ears (104a, 104b) integral with the main part and in each of which is housed one of the ears of the horse, an auditory device (300) including a reception module (302) including elements for receiving signals, a transformation module (304) including elements for transforming the signals received into sounds audible to the horse, and a pair of loudspeakers (306) connected to the transformation module (304), each of the loudspeakers (306) being housed and fixed inside an ear (104a, 104b) of the hood (100).

5 Claims, 2 Drawing Sheets

Figure 4:
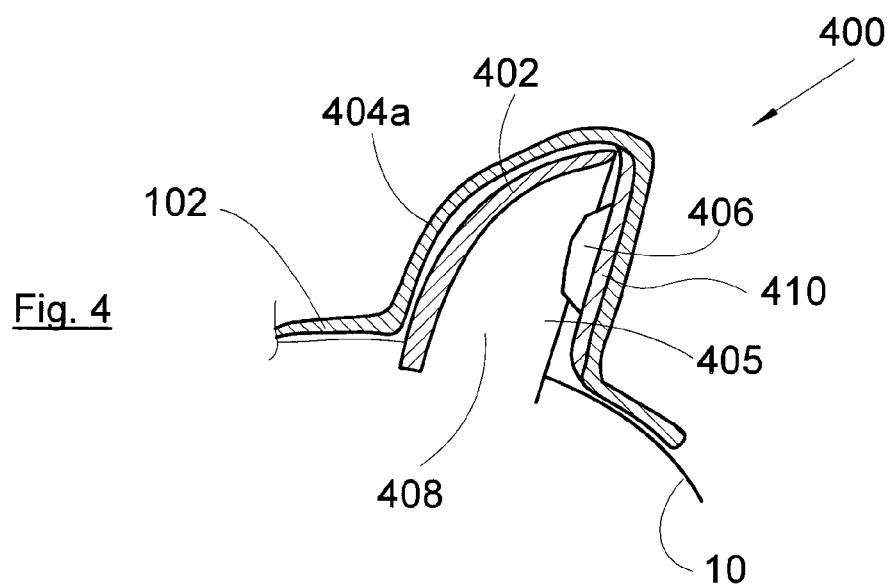

(51) Int. Cl.
*A01K 13/00* (2006.01)
*A01K 15/02* (2006.01)
*A01K 29/00* (2006.01)
*B68C 5/00* (2006.01)

(56) References Cited

U.S. PATENT DOCUMENTS

| | | |
|---|---|---|
| 2009/0071414 A1 | 3/2009 | Caputo |
| 2010/0263603 A1 | 10/2010 | Baron |
| 2011/0017150 A1* | 1/2011 | Caputo .................. A01K 15/02 |
| | | 119/719 |

* cited by examiner

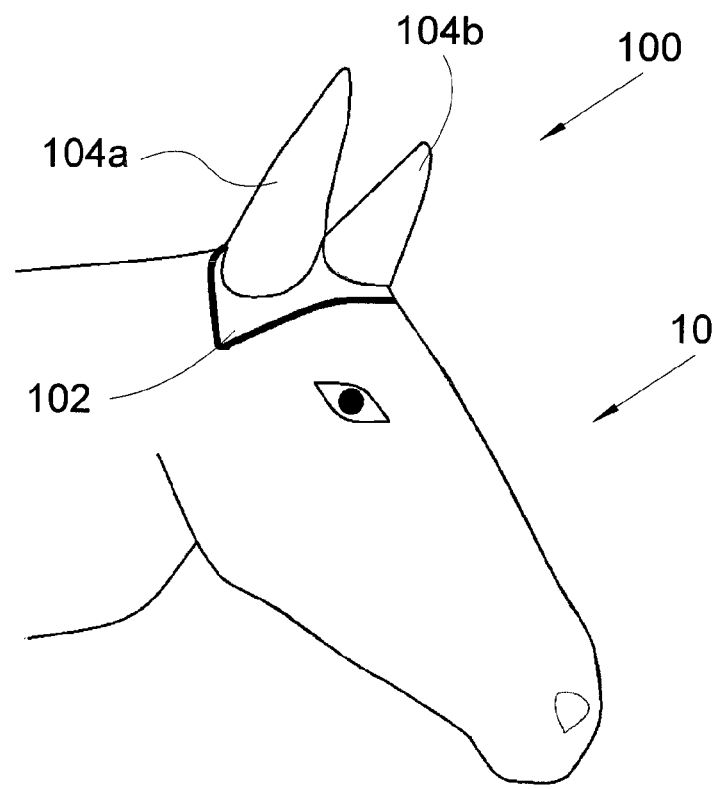
Fig. 1
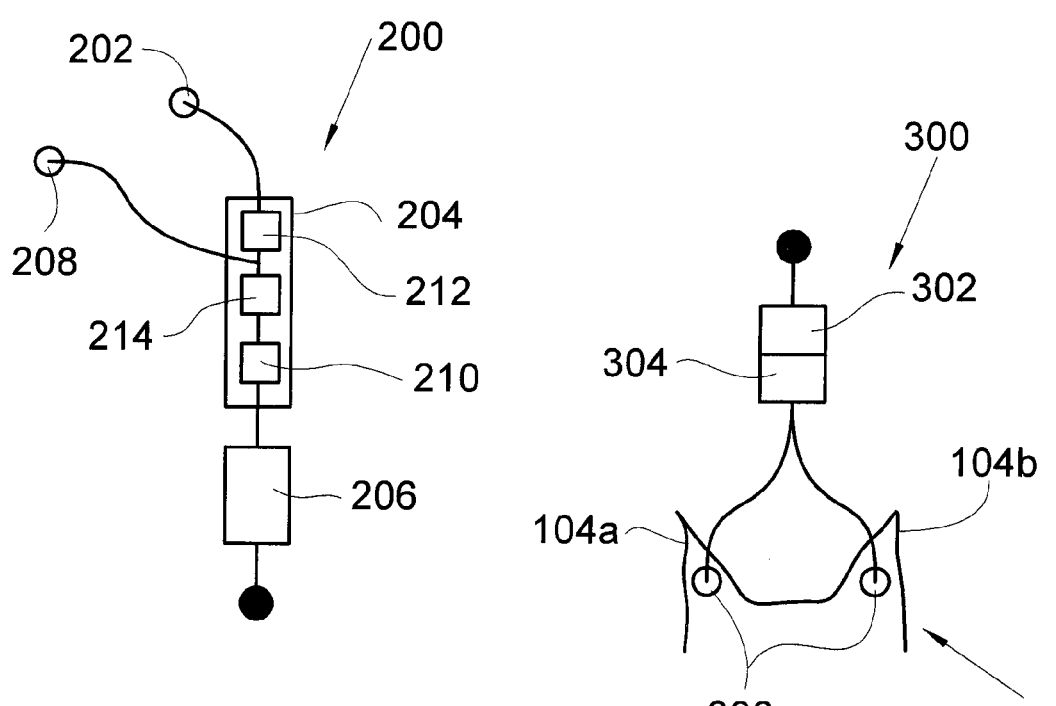
Fig. 2
Fig. 3

HOOD FOR A HORSE'S HEAD

This invention relates to a hood for a horse provided with an auditory device, a transmission case for the rider, and a system of transmission between a rider and a horse comprising such a hood and such a case.

A hood for a horse is conventionally made from fabric and comprises a main part which is placed on the head of the horse and two ears integral with the main part and in each of which is housed one of the ears of the horse.

Such a hood limits the discomfort caused by flying insects, and acts as a noise limiter.

Such a hood does not always provide satisfaction as the oral commands of the rider are then also attenuated.

An object of this invention is to propose a hood for a horse that does not have the disadvantages of prior art and which in particular makes it possible to attenuate the outside noise without limiting the oral commands of the rider.

To this effect, a hood for the head of a horse is proposed comprising:
  a main part intended to be placed on the head,
  two ears integral with the main part and in each of which is housed one of the ears of the horse,
  an auditory device comprising a reception module comprising means for receiving signals, a transformation module comprising means for transforming the signals received into sounds audible to the horse, and a pair of loudspeakers connected to said transformation module, with each one of the loudspeakers being housed and fixed inside an ear of the hood.

According to a particular embodiment, each loudspeaker is fixed on the wall of the ear of the hood that is intended to come opposite the entrance of the pinna of the ear of the horse.

According to a particular embodiment, each loudspeaker is housed in an earplug integral with the hood and intended to be housed in the pinna of the ear of the horse.

Advantageously, the hood comprises means forming a slider which have a female element passing through the wall of the ear of the hood and a male element that is mobile with respect to the female part which carries the earplug and which can be manoeuvred from the outside of the hood.

Advantageously, one of the earplugs is provided with a means for measuring intended for measuring at least one physiological constant of the horse, the means for measuring is connected to the reception module, the reception module comprises means for storing the values of said physiological constants and/or means for transmitting said values.

Advantageously, the hood comprises an acoustic insulating lining arranged inside the hood and outside with respect to the loudspeaker.

The invention also proposes a transmission case for a rider and comprising:
  a source of audio signals,
  a transmission module comprising means for transmitting the signals representing audio signals from the source to a reception module of a hood according to one of the preceding alternatives, and
  between the source and the transmission module, a processing module comprising means for transforming intended to transform the audio signals into signals for the transmission module.

Advantageously, the transmission module comprises means for receiving the physiological values of the horse and means for storing them.

Advantageously, the processing module comprises means for varying intended to vary the rhythm of the audio signals, said transmission case comprises at least one loudspeaker, the means for varying are arranged upstream of the means for transforming and each loudspeaker is connected to the processing module downstream of the means for varying and upstream of the means for transforming.

Advantageously, the processing module comprises means for modulating intended to vary the frequency of the audio signals received from the audio source or from the means for varying, the means for modulating are arranged upstream of the means for transforming and downstream of the means for varying if they exist, and the loudspeaker is connected to the processing module upstream of the means for modulating and downstream of the means for varying if they exist.

Advantageously, the transmission case comprises a means for auditory adjusting making it possible to adjust the volume level of the loudspeakers of the hood.

The invention also proposes a system of transmission between a rider and a horse comprising, for the rider, a transmission case according to one of the preceding alternatives, and, for the horse, a hood according to one of the preceding alternatives.

Figure 5:
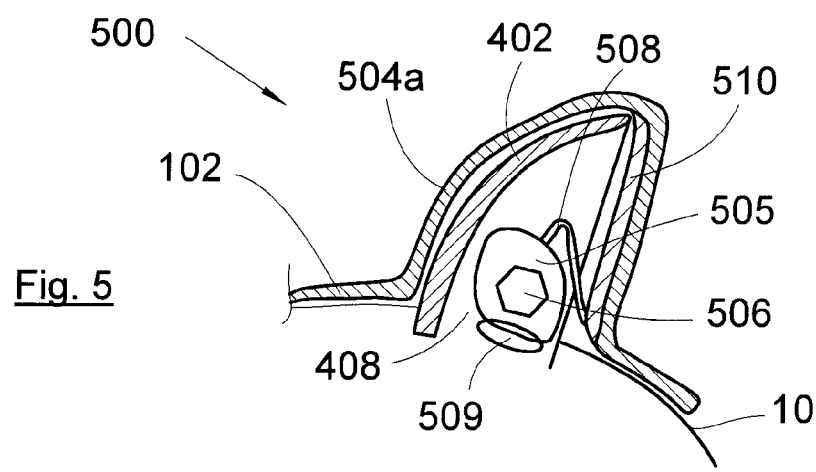
Figure 6:
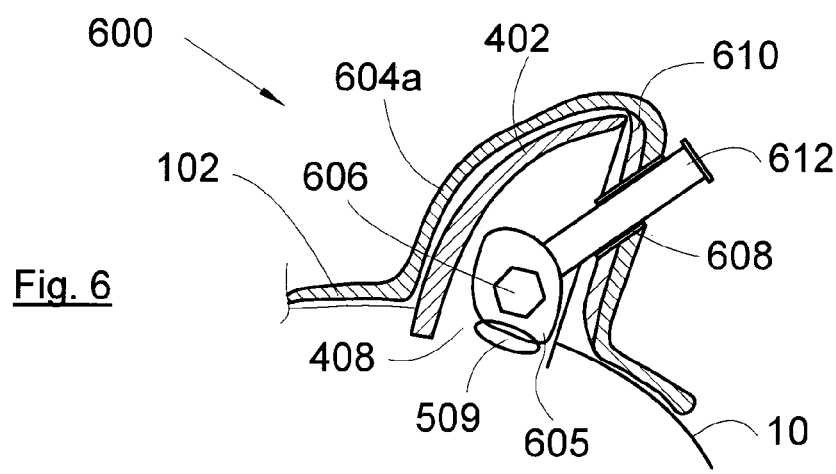

The characteristics of the invention mentioned hereinabove, as well as others, shall appear more clearly when reading the following description of an embodiment, said description being given in relation with the attached drawings, among which:

FIG. 1 shows a head of a horse provided with a hood according to the invention,

FIG. 2 diagrammatically shows a case for a rider according to the invention,

FIG. 3 diagrammatically shows the hood according to the invention,

FIG. 4 shows a cross-section according to a vertical plane perpendicular to the forward direction of the horse of a hood according to a first embodiment of the invention, FIG. 5 shows a cross-section according to a vertical plane perpendicular to the forward direction of the horse of a hood according to a second embodiment of the invention, and FIG. 6 shows a cross-section according to a vertical plane perpendicular to the forward direction of the horse of a hood according to a third embodiment of the invention.

In the description that follows, the term "rider" encompasses the person who is on the horse as well as the person who is at a distance from the horse and who is giving it commands.

FIG. 1 shows a head 10 of a horse that is wearing a hood 100. The hood 100 comprises a main part 102 which is placed on the head 10 and two ears 104a and 104b integral with the main part 102 and in each of which is housed one of the ears of the horse.

The term "hood" encompasses all of the devices adapted to be placed on the head 10 of the horse and encompass the ears 104a-b of the horse.

FIG. 2 shows a transmission case 200 for the rider.

The transmission case 200 comprises a source 202 of audio signals, a transmission module 206 comprising means for transmitting the signals representing audio signals from the source 202 to a reception module (302, FIG. 3) of the hood 100, and between the source 202 and the transmission module 206, a processing module 204 comprising means for transforming 210 intended to transform the audio signals into signals for the transmission module 206.

FIG. 3 shows the hood 100 provided with an auditory device 300 that comprises the reception module 302 comprising means for receiving the signals emitted by the transmission module 206, a transformation module 304 comprising means for transforming the signals received by the reception module 302 into sounds audible to the horse, and a pair of loudspeakers 306 connected to said transformation module 304, with each one of the loudspeakers 306 being housed and fixed inside an ear 104a, 104b of the hood 100.

Therefore, the audio signals coming from the audio source 202 are transmitted directly to the inlet of the ears of said horse and are no longer attenuated by the hood 100.

The transmission of the signals between the transmission module 206 and the reception module 302 is more preferably a wireless transmission and any suitable protocol can be considered, such as for example, Bluetooth, Wifi, etc. It can also be considered that the transmission be a wired transmission, or via air of the stethoscope type.

The various modules of the auditory device 300 and of the transmission case 200 comprise electronic elements and suitable software.

The auditory device 300 and the transmission case 200 are electrically powered by a battery for example of the battery or accumulator type.

FIG. 4 shows a cross-section of the head 10 and of an ear 404a of the hood 400 according to a first embodiment of the invention.

The ear 404a of the hood 400 surrounds the ear 402 of the horse and has across from the inlet 405 of the pinna 408, a loudspeaker 406 which is oriented towards the inside of the pinna 408. The loudspeaker 406 is therefore fixed to the wall of the ear 404a of the hood 400 which is intended to come opposite the inlet 405.

Of course, the other ear of the hood 400 comprises the same elements.

FIG. 5 shows a cross-section of the head 10 and of an ear 504a of the hood 500 according to a second embodiment of the invention.

The ear 504a surrounds the ear 402 of the horse and has an earplug 505 integral with the hood 500 and housed in the pinna 408 and wherein is housed a loudspeaker 506.

The earplug 505 is placed very close to the inlet of the ear canal 509 of the ear 402 of the horse.

The earplug 505 is integral with the ear 504a of the hood 500 and here it is linked to the ear 504a of the hood 500 by a cord 508 which is more particularly fixed to the lower part of the ear 504a in order to facilitate the setting in place of the earplug 505.

Of course, the other ear of the hood 500 comprises the same elements.

FIG. 6 shows a cross-section of the head 10 and of an ear 604a of the hood 600 according to a third embodiment of the invention.

The ear 604a surrounds the ear 402 of the horse and has an earplug 605 integral with the hood 600 and housed in the pinna 408 and wherein is housed a loudspeaker 606.

The hood 600 also has means forming a slider and whereon is fixed the earplug 605. Therefore, by displacement of the means forming a slider, the earplug 605 can be placed very close to the inlet of the ear canal 509 of the ear 402 of the horse.

The means forming a slider comprise a female element 608 which passes through the wall of the ear 604a of the hood 600 which is intended to come opposite the inlet of the pinna 408, and a male element 612 mobile in translation inside the female element 608 and at the end of which is fixed the earplug 605. The male element 612 can be manoeuvred from the outside of the hood 600.

The female element 608 has the form of a hollow cylinder passing through the wall of the ear 604a and the male element 612 takes the form of a cylinder coaxial to the hollow cylinder which slides inside the hollow cylinder 608 along the axis of the hollow cylinder.

Therefore, when the hood 600 is placed on the head 10 of the horse, the rider can displace the male element 612 in order to adjust the position of the earplug 605 in relation to the inlet of the ear canal 509.

The orientation of the direction of translation is adapted to the shape of the head 10 of the horses.

Of course, the other ear of the hood 600 comprises the same elements.

Each one of the loudspeakers 306, 406, 506 and 606 is oriented towards the inside of the ear 402 of the horse.

In order to improve the acoustic insulation of the horse in relation to the outside, the hood 100 comprises an acoustic insulating lining 410, 510, 610 which is arranged inside the hood 400, 500, 600 and outside with respect to the loudspeaker 406, 506, 606. The lining 410, 510 is made for example from cellulose wadding or from brushed polyester, cotton, viscose or chlorofibres, with a multilayer architecture, integrated under a lining for example made from nylon.

In the case of the third embodiment, the female element 608 also passes through the acoustic insulating lining 610.

The source audio 202 can be a microphone wherein the rider speaks in order to direct his horse.

The audio source 202 can be a recording, for example musical, stored directly in a memory of the transmission case 200 or in a memory of a complementary device that is connected to the transmission case 200 using a wired connection. For this purpose, the transmission case 200 comprises an adapted connection socket. The transmission case 200 can also comprise a suitable means of communication that allows for wireless communication with the complementary device, whether through a wifi, bluetooth, or other connection.

So that the rider can be in tune with his horse, the transmission case 200 comprises at least one loudspeaker 208 intended to emit the signals from the audio source 202 to the rider. Each loudspeaker 208 is then connected to the processing module 204 upstream of the means for transforming 210, i.e. before the audio signals are transformed into signals for the transmission module 206.

The rider and the horse therefore listen to the same audio programme.

In order to have the horse and the rider work at a particular rhythm, for example in the case of a musical recording, the processing module 204 comprises means for varying 212 intended to vary the rhythm of the audio signals as controlled by the rider, which can be for example a touch-sensitive control on a screen.

The means for varying 212 are arranged upstream of the means for transforming 210 and each loudspeaker 208 is connected to the processing module 204 downstream of the means for varying 212.

It is then possible to accelerate or to slow down the rhythm both for the rider and for the horse.

Horses hear better sounds which are in the frequency range of 3 kHz to 5 kHz.

The processing module 204 advantageously therefore comprises means for modulating 214 intended to vary the frequency of the audio signals received from the audio source 202 or means for varying 212. The means for modulating 214 are for example a variable band pass filter or a set of filters such as low-pass filter, high-pass filter, band pass filter, notch filter and/or electronic equalizers and electronic amplifiers.

The means for modulating 214 are arranged upstream of the means for transforming 210 and downstream of the means for varying 212 if they exist and each loudspeaker 208 is connected to the processing module 204 upstream of the means for modulating 214 and downstream of the means for varying 212 if they exist.

It is then possible to modify the frequency of the sounds audible to the horse without modifying those audible to the rider.

The auditory device 300 and the transmission case 200 can also comprise means for audio amplification.

The transmission case 200 can also comprise a means for auditory adjusting, controlled for example by a button or a touch-sensitive control on a screen, and which makes it possible to adjust the volume level of the loudspeakers 306, 406, 506 and 606 of the hood 100.

The transmission case 200, and more particularly the microphone 202, and the loudspeakers 208 are fixed to the riding cap of the rider by suitable means of fastening.

According to the invention, a system of transmission between a rider and a horse comprises, for the rider, a transmission case 200 according to one of the preceding alternatives, and, for the horse, a hood 100 according to one of the preceding alternatives.

In order to protect the head 10 of the horse from electromagnetic waves, the hood 100, 400, 500, 600 is lines over its entire contact surface with the head 10 with a shielded cloth veil constituting a screen against electromagnetic waves. This shielded veil is hypoallergenic and biocompatible.

According to a particular embodiment of the invention, one of the earplugs 505, 605 is provided with a means for measuring intended for measuring at least one physiological constant of the horse. The means for measuring is electrically connected to the reception module 302 which comprises means for storing the values of said physiological constants. The reception module 302 can also comprise means for transmitting said values to the transmission module 206 which then comprises means for receiving said values and means for storing them.

The means for transmitting the values and the means for receiving them can be any element suited for carrying out a wireless communication between the reception module 302 and the transmission module 206 (wifi, bluetooth, etc.).

The physiological constants can be one or several of the following constants: body temperature, heartbeat, breathing rate or blood pressure.

The means for measuring can be of the ear thermometer type, a pulse oximeter, an infrared sensor of the pulsar type (photodiode and infrared emitter).

Of course, this invention is not limited to the examples and embodiments described and shown, but it can undergo many alternatives accessible to those skilled in the art.

For example, it can be considered that the trainer and the rider each have a transmission case making it possible for each one of them to communicate with the horse and for the trainer to communicate with the rider.

It can also be considered that when there are several riders and one trainer, each one of them has a transmission case, each one of the horses is provided with a hood according to the invention and the trainer can choose the rider or riders and/or the horse or the horses with whom he wants to communicate.

The invention claimed is:
1. A hood for a head of a horse comprising:
a main part intended to be placed on the head;
two ears integral with the main part and in each of which is housed one of the ears of the horse; and
an auditory device comprising a reception module comprising means for receiving signals, a transformation module comprising means for transforming the signals received into sounds audible to the horse, and a pair of loudspeakers connected to said transformation module, with each one of the loudspeakers being housed and fixed inside an ear of the hood,
wherein each loudspeaker is housed in an earplug integral with the hood and intended to be housed in the pinna of the ear of the horse, and
wherein said hood comprises means forming a slider which have a female element passing through the wall of the ear of the hood and a male element that is mobile with respect to the female part which carries the earplug and which can be manoeuvred from the outside of the hood.

2. The hood according to claim 1, wherein each loudspeaker is housed in an earplug integral with the hood and intended to be housed in the pinna of the ear of the horse, and wherein one of the earplugs is provided with a means for measuring at least one physiological constant of the horse, wherein the means for measuring is connected to the reception module, wherein the reception module comprises means for storing the values of said physiological constants and/or means for transmitting said values.

3. A transmission case for a rider and comprising:
a source of audio signals;
a processing module connected to the source of the audio signals, the processing module comprising means for transforming the audio signals into signals representing the audio signals; and
a transmission module connected to the means for transforming such that the processing module is between the source and the transmission module, transmission module comprising means for transmitting signals representing the audio signals from the source to a reception module of a hood, said hood comprising:
a main part intended to be placed on the head of a horse,
two ears integral with the main part and in each of which is housed one of the ears of the horse,
an auditory device comprising a reception module comprising means for receiving the signals transmitted from the means for transmitting,
a transformation module comprising means for transforming the signals received into sounds audible to the horse, and
a pair of loudspeakers connected to said transformation module, with each one of the loudspeakers being housed and fixed inside an ear of the hood,
wherein each loudspeaker is housed in an earplug integral with the hood and intended to be housed in the pinna of the ear of the horse, one of the earplugs is provided with a means for measuring at least one physiological constant of the horse, the means for measuring is connected to the reception module, the reception module comprises means for storing the values of said physiological cal constants and/or means for transmitting said values, and
wherein the transmission module comprises means for receiving the physiological values of the horse and means for storing them.

4. The transmission case according to claim 3, wherein the processing module comprises means for varying the rhythm of the audio signals, said transmission case comprises at least one loudspeaker, the means for varying are arranged upstream of the means for transforming and each loudspeaker is connected to the processing module downstream of the means for varying and upstream of the means for transforming.

5. The transmission case according to claim 3, wherein the processing module comprises means for modulating the frequency of the audio signals received from the audio source or means for varying the frequency of the audio signals, the means for modulating are arranged upstream of the means for transforming and downstream of the means for varying if they exist, and each loudspeaker is connected to the processing module upstream of the means for modulating and downstream of the means for varying if they exist.

* * * * *